July 5, 1960 C. B. TRIMBLE 2,943,853

RECORD TAPE SUPPLY MEANS

Original Filed Sept. 30, 1954 2 Sheets-Sheet 1

INVENTOR
CEBERN B. TRIMBLE

BY Louis A Kline
Albert L. Sessler, Jr.
HIS ATTORNEYS

INVENTOR
CEBERN B. TRIMBLE
BY Louis A Kline
Albert L. Sessler, Jr.
HIS ATTORNEYS United States Patent Office 2,943,853

Patented July 5, 1960

2,943,853

RECORD TAPE SUPPLY MEANS

Cebern B. Trimble, Dayton, Ohio, assignor to The National Cash Register Company, Dayton, Ohio, a corporation of Maryland Original application Sept. 30, 1954, Ser. No. 459,476, now Patent No. 2,864,609, dated Dec. 16, 1958. Divided and this application Aug. 1, 1957, Ser. No. 675,674

2 Claims. (Cl. 242—55.18)

The present invention relates to tape-handling apparatus and particularly to a record tape supply means adapted for use in connection with other tape-processing equipment.

This application is a division of United States patent application Serial No. 459,476, filed September 30, 1954, now Patent No. 2,864,609, patented December 16, 1958.

Tape-processing equipment is widely used in business and industry in connection with record-keeping, data processing, automatic control mechanisms, etc. Both magnetic tape and perforated tape form convenient means of storing information for future use.

Customarily, the tape to be used in tape-processing equipment will have been previously stored in a device which enables the tape to be fed to the tape-processing equipment as required. A need, therefore, exists for a simple, effective, and inexpensive tape supply means which is self-feeding and self-regulating, and which feeds the tape out to the tape-processing equipment in the same relative order in which data was previously recorded on the tape, to eliminate the necessity of utilizing data from the tape in an order which is opposite to the order in which it was recorded.

With the foregoing in mind, among the objects of the present invention are the following: the provision of record tape supply means which is simple and inexpensive to fabricate, while being at the same time rugged in construction; the provision of such apparatus in which the tape is stored in the form of a roll, and in which feeding takes place from the inside of said roll; the provision of such apparatus in which inertia effects due to starting and stopping are minimized; and the provision of such apparatus which is self-feeding and self-regulating.

The objects of the invention are accomplished by a tape-supplying means in the form of apparatus for driving a roll of record tape, or at least supplying the tape for feeding purposes. The supplying means is self-feeding when a tension is established in the tape by, for example, the application of a very slight drawing force to the tape, but is relaxed or non-feeding in the absence of the tension or slight drawing force. This feed is effected from the inside of the roll, thereby enabling entries on the tape to be read in the same order in which they were made without rewinding the tape, once it is removed from the machine in the form of a record. The roll is mounted about a plurality of shoes which are adjustable and which outline a core for accommodating the hollow interior of the roll. A plurality of driving rollers, usually in the form of cylinders having a rubber or felt covering to increase the surface friction, are interspersed among the shoes along the core outline, so that the rollers engage the innermost layer of tape and urge it in a direction to unwind it from the record roll. The inner end of the tape is extended about a portion of the circumference of one of the driver rolls and is directed generally inwardly of the record roll to an exit roller, which serves as a guide for the tape leaving the region of the supplying means. The driving rollers are normally continuously rotating but, in the absence of a drawing force applied to the end of the tape, do not cause the tape to be unwound because of slippage between the driving rollers and the innermost layer of tape of the record roll. However, when a drawing force or tension is applied to the end of the tape being removed from the record roll, as, for example, by the driving capstan, tensioning of the innermost layer causes the tape to hug the emerging driving roller more tightly, so that sufficient frictional engagement is established to cause the emerging roller to drive the tape to feed the tape from the roll. This driving engagement pulls the innermost layer of tape more tightly against the shoe adjacent to the emerging driving roller and consequently establishes driving engagement with a further one of the driving rollers, the tightening of the innermost layer of tape against the driving rollers being successive in a progressive manner evidenced by the second, third, and fourth inner layers of the tape (and so on) being drawn inwardly further to tighten the innermost layer of the tape against the shoes and the driving rollers as the tape is unwound.

The foregoing outlined features and objects of the invention, along with others appearing hereinafter, will become more apparent from a reading of the following detailed description of the invention when viewed in the light of the accompanying drawings, wherein.

The novel tape supply means of the present invention will normally be associated with some form of tape-processing device. For purposes of illustration, the present invention is herein shown and described as being associated with the tape-reading apparatus disclosed in the United States patent application Serial No. 459,476, filed September 30, 1954, of which this application is a division, and to which reference may be had for a complete description of the tape-reading apparatus. It will be understood, however, that the novel tape supply means could be used with many other types of tape-processing devices.

Figure 1:
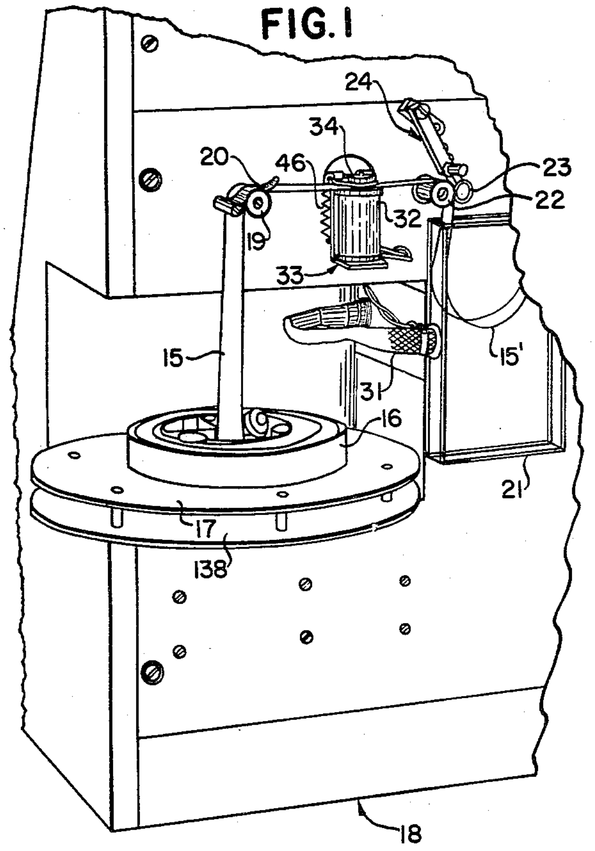
Fig. 1 is an isometric view of the tape supply means of the present invention, shown in association with a tape-processing device, the latter being shown only in part.

Referring now to the drawings, and particularly to Fig. 1, there is shown a record tape 15 of any suitable type, such as magnetic tape or perforated tape, emerging from the inside of the record roll 16, supported on a plate 17, in turn supported by a frame 18. The tape 15 passes between an idler 19 and a spring clip 20, which merely guide the tape from a vertical path to a horizontal path. The tape 15 is driven into an input tape loop box 21 by a continuously-rotating input tape loop driving capstan 22, against which the tape is resiliently pressed by a roller 23 under spring pressure from a toggle mechanism 24. The lowermost position 15' of the tape loop contained in the box 21 is illustrated slightly above the level of a light beam passing from a light source (not shown) to a photocell located within a shield housing 31. When the tape loop lengthens to interrupt the light beam from the light source, a brake coil 32 of a first auxiliary brake 33 is energized to pull its armature 34 downwardly against the tape 15 and press the tape against the brake pole piece, thereby arresting the tape motion, the tape slipping with respect to the continuously-rotating driving capstan 22.

A main driving capstan, a reading station, and a high-speed brake, none of which are shown herein, cooperate to read the record tape in the manner described in the previously-cited United States patent application, Serial No. 459,476. The main driving capstan engages the tape 15 and drives it from the input tape loop box 21 through the reading station. When the lower portion 15' of the tape loop disposed in the input loop box 21 is raised or removed from the path of the previously-mentioned light beam by the main driving capstan, the photocell in the housing 31 is again excited to relieve the power applied to the brake coil 32. The armature 34 then applies only a slight drag to the tape under the pressure of a chatter-eliminating spring 46 of the first auxiliary brake, permitting the tape loop in the box 21 to be extended or lengthened by driving engagement between the input loop driving capstan 22 and the tape. The lengthening and shortening of the loop in the input loop box 21 is somewhat intermittent in the well-known "hunting" fashion. Under these circumstances, the input tape loop driving capstan 22 is responsible only for driving the tape 15 from the roll 16 effectively to the lowermost point 15' of the loop in the input tape loop box, and the main driving capstan only drives the tape from the lowermost portion of the loop in the box 21 through the reading station.

Figure 2:
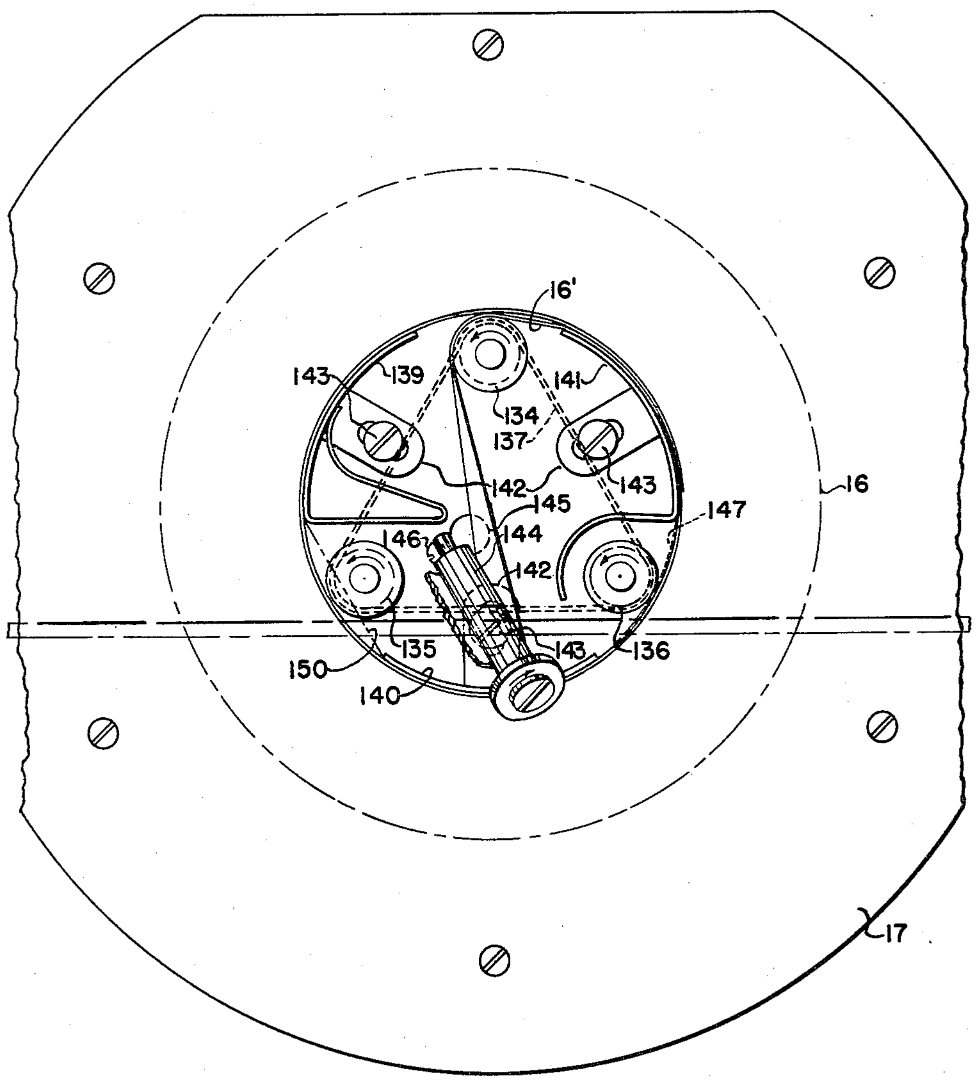
Fig. 2 is a view in plan of the tape supply means including a roll of tape adapted to be unreeled from the inside.

In Fig. 2 is illustrated the tape-supplying mechanism, which is shown generally in Fig. 1. This mechanism not only is capable of supplying tape via a tape loop, as shown in Fig. 1, but also is suitable for introducing tape directly to the reading station or other mechanism of a tape-processing device. A tape-feeding driver 134 and a pair of auxiliary drivers 135 and 136 are supported above the plate 17 (Fig. 1) in spaced-apart relation. The drivers are of the roller type, being cylinders preferably covered with a layer of rubber or other friction material to enable effective engagement with the innermost layer of tape 16' of the tape roll 16. The drivers are continuously rotating, being coupled together by a driving belt 137 located beneath the plate 17 and above the plate 138 (Fig. 1).

A plurality of arcuate shoes, herein represented as the three shoes 139, 140, and 141, are also supported from the plate 17 in mutually-spaced-apart relation to outline a core adapted to accommodate the roll of record tape 16. The shoes include inwardly-protruding lugs or projections 142, each slotted to accommodate adjusting screws 143. The shoes may be moved radially to hold the roll of record tape with its innermost layer 16' normally out of driving engagement with the drivers 134, 135, and 136. The drivers are arranged with respect to the shoes in such a way that a portion of the periphery of each is, respectively, located within segments of the circular core defined by lines, such as the broken line 150, extending between opposed shoe extremities. The emerging tape extends over a portion of the periphery of the tape-feeding driver 134 and is directed inwardly of the core outline to an exit roller 144, obliquely located with respect to the plane of the tape roll 16, with its innermost end secured to an upright post 145, projecting out of the plate 17, by means of a screw 146.

The exit roller 144 merely serves as a guide to direct the tape outwardly of the plane of the roller 16, which direction (looking at Fig. 1) is vertical, to the idler 19. In order to remove the tape from the roll, a slight drawing force is applied to the emerging tape, effective in the direction of unwinding, to tension the tape or take up the slack in the tape up to the point of its engagement with the tape-feeding driver 134, so that the tape is brought into driving engagement with a portion of the periphery of the tape-feeding driver 134, which driver then starts the tape feeding from the roll. Once feeding engagement is established with the driver 134, the innermost layer of tape 16' is brought to bear against the shoes 140 and 141 and tends to occupy a position similar to line 150. This will force the tape into engagement with the periphery of the driver 136, the tape being tautly drawn between the arcuate shoes 140 and 141 to occupy a position generally indicated by the dotted line 147. Upon establishment of driving engagement with the auxiliary driver 136, the tape is caused to be tautly drawn between the arcuate shoes 139 and 140 to establish driving engagement with the auxiliary driver 135. The pressure of the innermost layer of the roll against the drivers 134, 135, and 136 causes the drivers to feed the tape to unwind it from the roll. The pull exerted by the driver 135 in turn draws the next innermost layer of tape on the roll 16 inwardly to increase the tape pressure effective against the tape-feeding driver 134, the increased effective driving engagement being successively introduced to auxiliary drivers 136 and 135 by the second-innermost layer of tape on the roll 16. This process is continued, causing progressive layers to increase the effective driving engagement, resulting in a force maintaining the tape roll 16 in a tight configuration while supplying tape from the inside of the roll in response to a tension or call for tape.

One of the most important advantages of an inside tape-feeding apparatus, such as that shown in Fig. 2, resides in feeding the tape to the reader in the same order in which entries were made thereon without requiring a rewinding of the roll. A further advantage offered by the tape-supplying apparatus of Fig. 2 resides in the elimination of the effect of the mass of the supplying means from the tape feed on the high-speed starting and stopping of the tape. The tape-supplying means, which is power-operated, is immediately responsive to the call for tape in automatically unwinding tape from the reel. The tension established in the tape (by the auxiliary driving capstan 22 in the apparatus shown in Fig. 1, or by the main driving capstan if the auxiliary capstan 22 is not employed) need only be sufficient to eliminate the slack in the tape, thereby drawing it into engagement with the tape-feeding driver 134. In the alternative, a signal or call for tape could result in the pressure of a finger or pressure roller against the tape-feeding driver 134 to provide the driving engagement between the tape and the driver 134.

While the form of invention illustrated and described herein is admirably adapted to fulfill the objects aforesaid, it is to be understood that it is not intended to confine the invention to the form or embodiment disclosed herein, for it is susceptible of embodiment in various other forms.

What is claimed is:

1. In a tape-feeding apparatus, a tape supply device adapted to unreel tape from the inside of a tape storage roll in response to a tape-required signal applied to the tape and effective to unreel tape from the roll, comprising a planar support for the roll to be unwound, a plurality of arcuate shoes extending outwardly of the support in spaced-apart relation to outline a circular core for accommodating the tape roll, a plurality of driving capstans respectively interspersed with the shoes within the core outline, said capstans respectively having those portions of their peripheries closest to the circumference of the circular core lying outwardly of lines defined by chords of the circular core extending between opposed edges of the shoes and lying inwardly of the circumference of the core, means for guiding tape outwardly from the roll interior over one of the driving capstans, and means for imparting continuous rotation to the driving capstans whereby in the absence of the tape-required signal the innermost layer of tape expands outwardly due to the resiliency of the tape in the roll and moves out of driving engagement with the capstans, whereas, in response to a tape-required signal, successively outwardly positioned layers of the tape, including the innermost layer, contract toward the configuration of the chords between opposed edges of the shoes to increase the driving engagement between the capstans and the innermost layer.

2. In a tape-feeding apparatus, a tape supply device adapted to unreel tape from the inside of a tape storage roll in response to a force applied to the emerging tape, comprising, in combination, a planar support for the roll to be unwound; a plurality of arcuate shoes mounted on the support to form a circular core having peripheral gaps, said core being capable of accommodating the tape roll; a plurality of driving capstans positioned in the gaps and so arranged with respect to the arcuate shoes that the peripheries of the capstans are spaced inwardly from the circular outline of the core, but are located outwardly of a straight line extending between adjacent ends of adjacent shoes, so that when the tape of the roll is not taut and follows the circular core outline it does not contact the capstans, but when it is drawn taut toward a straight line between adjacent ends of adjacent shoes, it contacts the capstans; and means for imparting continuous rotation to the capstans, so that the tape is fed thereby whenever it is brought into contact with the capstans by being drawn taut by the force applied to the emerging tape.

References Cited in the file of this patent

UNITED STATES PATENTS

| | | |
|---|---|---|
| 994,044 | Uebelmesser | May 30, 1911 |
| 1,505,389 | Herm | Aug. 19, 1924 |
| 1,602,257 | Shirlow et al. | Oct. 5, 1926 |
| 1,604,389 | Cohn | Oct. 26, 1926 |
| 2,464,965 | Chemel | Mar. 22, 1949 |